US011894167B2

(12) United States Patent
Terashima et al.

(10) Patent No.: US 11,894,167 B2
(45) Date of Patent: Feb. 6, 2024

(54) GRAIN-ORIENTED ELECTRICAL STEEL SHEET, IRON CORE OF TRANSFORMER, TRANSFORMER, AND METHOD FOR REDUCING NOISE OF TRANSFORMER

(71) Applicant: JFE STEEL CORPORATION, Tokyo (JP)

(72) Inventors: Takashi Terashima, Tokyo (JP); Makoto Watanabe, Tokyo (JP); Toshito Takamiya, Tokyo (JP); Tomoyuki Okubo, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 521 days.

(21) Appl. No.: 16/474,646

(22) PCT Filed: Nov. 17, 2017

(86) PCT No.: PCT/JP2017/041463
§ 371 (c)(1),
(2) Date: Jun. 28, 2019

(87) PCT Pub. No.: WO2018/123339
PCT Pub. Date: Jul. 5, 2018

(65) Prior Publication Data

US 2019/0333662 A1 Oct. 31, 2019

(30) Foreign Application Priority Data

Dec. 28, 2016 (JP) ................................ 2016-254787

(51) Int. Cl.

| | |
|---|---|
| ***C23C 22/78*** | (2006.01) |
| ***C23G 1/08*** | (2006.01) |
| ***H01F 1/147*** | (2006.01) |
| ***H01F 27/34*** | (2006.01) |
| *H01F 27/245* | (2006.01) |

(52) U.S. Cl.
CPC ............. *H01F 1/147* (2013.01); *C23C 22/78* (2013.01); *C23G 1/083* (2013.01); *H01F 27/34* (2013.01); *H01F 27/245* (2013.01)

(58) Field of Classification Search
CPC ....... C23C 22/78; C23C 22/188; C23C 22/12; C23C 22/74; C23C 22/22; C23C 22/20; C23C 22/18; C23G 1/083; H01F 1/147; H01F 1/153; H01F 27/34; H01F 27/245
See application file for complete search history.

(56) References Cited

U.S. PATENT DOCUMENTS

| | | | | |
|---|---|---|---|---|
| 2008/0190520 A1* | 8/2008 | Watanabe | ................ | C21D 8/12 148/537 |
| 2014/0245926 A1* | 9/2014 | Muraki | ................ | C21D 8/1288 106/286.6 |
| 2016/0322138 A1 | 11/2016 | Han et al. | | |

FOREIGN PATENT DOCUMENTS

| | | | | |
|---|---|---|---|---|
| EP | 1 811 053 | A1 | | 7/2007 |
| EP | 3 255 640 | A1 | | 12/2017 |
| EP | 3 276 043 | A1 | | 1/2018 |
| JP | S48-39338 | A | | 6/1973 |
| JP | S50-79442 | A | | 6/1975 |
| JP | S-6141778 | A | * | 8/1984 |
| JP | S61-41778 | A | | 2/1986 |
| JP | H08-239770 | A | | 9/1996 |
| JP | H08-279409 | A | | 10/1996 |
| JP | 2007-217758 | A | | 8/2007 |
| JP | 2007217758 | A | * | 8/2007 |
| WO | 2007-136115 | A1 | | 11/2007 |
| WO | 2013-099455 | A1 | | 7/2013 |
| WO | 2016/125504 | A1 | | 8/2016 |
| WO | 2016/158325 | A1 | | 10/2016 |

OTHER PUBLICATIONS

Dec. 5, 2019 Extended Search Report issued in European Patent Application No. 17887457.4.
Dec. 19, 2017 International Search Report issued in International Patent Application No. PCT/JP2017/041463.
Oct. 14, 2020 Office Action issued in Chinese Patent Application No. 201780080754.4.
Mar. 30, 2021 Office Action issued in Chinese Patent Application No. 201780080754.4.
Aug. 23, 2021 Office Action issued in Korean Patent Application No. 10-2019-7018150.
Feb. 10, 2021 Office Action issued in Korean Patent Application No. 10-2019-7018150.
Nov. 2, 2021 Office Action issued in Korean Patent Application No. 10-2019-7018150.
Jan. 11, 2022 Office Action issued in Chinese Patent Application No. 201780080754.4.
Feb. 14, 2022 Office Action issued in Korean Patent Application No. 10-2021-7039703.

* cited by examiner

*Primary Examiner* — Humera N. Sheikh
*Assistant Examiner* — Kevin C T Li
(74) *Attorney, Agent, or Firm* — Oliff PLC

(57) ABSTRACT

A grain-oriented electrical steel sheet having an insulating film disposed on a surface thereon. The insulating film having a chemical composition comprising Si, P, O, and at least one selected from the group consisting of Mg, Ca, Ba, Sr, Zn, Al, Mn, and Co. The insulating film has a crystallinity in a range of 20% or more, and a minimum tension provided to the steel sheet by the insulating film at a temperature in a range of 100° C. to 200° C. is 10 MPa or more.

20 Claims, No Drawings

GRAIN-ORIENTED ELECTRICAL STEEL SHEET, IRON CORE OF TRANSFORMER, TRANSFORMER, AND METHOD FOR REDUCING NOISE OF TRANSFORMER

TECHNICAL FIELD

This application relates to a grain-oriented electrical steel sheet, an iron core of a transformer, a transformer, and a method for reducing noise of a transformer, and, in particular, to a grain-oriented electrical steel sheet excellent in terms of low-noise performance.

BACKGROUND

In general, in the case of a grain-oriented electrical steel sheet, a film is formed on the surface of the steel sheet to provide an insulating capability, workability, a rust preventing capability, and so forth. Such a film is usually composed of a forsterite-based base film, which is formed when final finish annealing is performed, and a phosphate-based topcoat film, which is formed on the base film.

Since the above-mentioned films are formed at a high temperature and have low thermal expansion coefficients, the films provide the steel sheet with tension due to differences in thermal expansion coefficient between the steel sheet and the films when the temperature is decreased to room temperature. As a result, there is a decrease in iron loss and magnetostriction. In particular, since there is a decrease in the magnetostriction amplitude of an iron core in the case where magnetostriction is decreased, it is possible to reduce noise of a transformer. Nowadays, since there is a growing demand for low-noise transformers, there is a demand for providing steel sheets with as high tension as possible.

In response to the demand for providing high tension, various kinds of films have been proposed to date. For example, Patent Literature 1 proposes a film composed mainly of magnesium phosphate, colloidal silica, and chromic anhydride, and Patent Literature 2 proposes a film composed mainly of aluminum phosphate, colloidal silica, and chromic anhydride.

However, since it may be said that tensile stress caused by a phosphate-based glass coating according to Patent Literature 1 or Patent Literature 2 is insufficient, there is a demand for further improvement.

In response to such a problem, Patent Literature 3 discloses a grain-oriented electrical steel sheet with which iron loss is reduced as a result of forming a coating film having a chemical composition containing P, Si, Cr, O, and at least one selected from the group consisting of Mg, Al, Ni, Co, Mn, Zn, Fe, Ca, and Ba, and a phosphate crystal phase in an amount of 5 mass % or more to generate high tensile stress.

In addition, Patent Literature 4 discloses a method for forming a chromium-free high-tension insulating film on a surface by using a metal phosphate and colloidal silica as main constituents and by controlling the crystallinity of the metal phosphate to be 60% or less, and Patent Literature 5 discloses a method for forming a chromium-free high-tension insulating film by using a phosphate and colloidal silica as main constituents and by dispersing crystalline magnesium phosphate uniformly throughout the film.

Certainly, crystallizing part of a vitreous phosphate film contributes to improving adhesion resistance and to increasing tension provided to a steel sheet. However, it was found that high noise is problematically generated by a transformer in the case where the transformer is actually manufactured by using a steel sheet manufactured by using the technique according to Patent Literature 3, Patent Literature 4, or Patent Literature 5.

CITATION LIST

Patent Literature

PTL 1: Japanese Unexamined Patent Application Publication No. 50-79442

PTL 2: Japanese Unexamined Patent Application Publication No. 48-39338

PTL 3: Domestic Re-publication of PCT International Publication No. 2013-099455

PTL 4: Japanese Unexamined Patent Application Publication No. 2007-217758

PTL 5: Domestic Re-publication of PCT International Publication No. 2007-136115

SUMMARY

Technical Problem

An object of the disclosed embodiments is to solve the problems described above, to provide a grain-oriented electrical steel sheet with which it is possible to achieve low-noise performance when the steel sheet is formed into the iron core of a transformer and used in practical operation, to provide the iron core of a transformer and a transformer which are manufactured by using the grain-oriented electrical steel sheet, and to provide a method for reducing noise of a transformer.

Solution to Problem

From the results of the diligent investigations conducted by the present inventors, the following findings were obtained.

By forming different coating films on the identical grain-oriented electrical steel sheets, and by conducting diligent investigations regarding the difference between a steel sheet used for a transformer generating low noise, that is, a low-noise steel sheet, and a steel sheet used for a transformer generating high noise, it was found that, in the case of the steel sheet used for a transformer generating high noise, there is a significant decrease in tension provided to the steel sheet by a film at a temperature of about 100° C. to 200° C. at which the transformer is practically operated.

From this result, the reason why noise is generated is considered to be because there is a significant decrease in tension provided to a steel sheet at a temperature of about 100° C. to 200° C. Further, it was found that, instead of tension provided to a steel sheet at room temperature, which has been determined and used for evaluation to date, tension provided to a steel sheet at a temperature of about 100° C. to 200° C., at which a transformer is practically operated, is important from the viewpoint of low noise. From the results of additional investigations, it was also found that there is an increase in tension provided to a steel sheet as a result of containing a crystal phase in an insulating film to utilize crystallization.

The disclosed embodiments have been completed on the basis of the findings described above, and the subject matter of the disclosed embodiments is as follows.

[1] A grain-oriented electrical steel sheet including an insulating film, in which the insulating film has a chemical composition containing Si, P, O, and at least one selected from Mg, Ca, Ba, Sr, Zn, Al, Mn, and Co and a crystallinity of 20% or more, and a minimum tension provided to the steel sheet by the insulating film at a temperature of 100° C. to 200° C. is 10 MPa or more.

[2] The grain-oriented electrical steel sheet according to item [1] above, in which the insulating film has a static friction coefficient of 0.21 or more and 0.50 or less.

[3] The grain-oriented electrical steel sheet according to item [1] or [2] above, in which the insulating film has the chemical composition containing no Cr.

[4] The grain-oriented electrical steel sheet according to any one of items [1] to [3] above, in which the insulating film has an average film thickness of 4.5 μm or less.

[5] An iron core of a transformer, the iron core including the grain-oriented electrical steel sheet according to any one of items [1] to [4] above.

[6] A transformer including the iron core according to item [5] above.

[7] A method for reducing noise of a transformer, the method including using the grain-oriented electrical steel sheet according to any one of items [1] to [4] above for an iron core of the transformer.

Advantageous Effects

According to the disclosed embodiments, it is possible to obtain a grain-oriented electrical steel sheet excellent in terms of low-noise performance. Since it is possible to reduce noise of a transformer, the steel sheet is useful as a material for a low-noise transformer. The iron core of a transformer and a transformer which are manufactured by using the grain-oriented electrical steel sheet according to the disclosed embodiments are excellent in terms of low-noise performance.

DETAILED DESCRIPTION

Hereafter, the disclosed embodiments will be described in detail. Here, when the content of the constituent of a chemical composition is expressed in units of %, "%" refers to "mass %", unless otherwise noted.

The insulating film formed on the surface of the grain-oriented electrical steel sheet according to the disclosed embodiments has a chemical composition containing Si, P, O, and at least one selected from Mg, Ca, Ba, Sr, Zn, Al, Mn, and Co and a crystallinity of 20% or more, and a minimum tension provided by the insulating film to the steel sheet at a temperature of 100° C. to 200° C. is 10 MPa or more.

Here, in the disclosed embodiments, the term "insulating film" refers to a phosphate-based tensile-stress insulating film (topcoat film).

The reason why a transformer generates noise is considered to be mainly because of the magnetostriction of an iron core. Magnetostriction is a phenomenon in which expansion and contraction occur when iron is magnetized, and it is known that there is an increase in the degree of magnetostriction when compressive stress is applied to iron. The iron core of a transformer is formed by placing steel sheets on top of one another, and steel sheets of several tens of tons are used in the case of a large transformer. Therefore, compressive stress is applied to the steel sheets due to their weight. Therefore, by providing tension to the steel sheets in advance, it is possible to counteract the effect of compressive stress. Therefore, it is possible to prevent an increase in the degree of magnetostriction by providing as high tension as possible to a steel sheet, which results in a reduction in noise of a transformer.

For the reasons described above, in the disclosed embodiments, regarding tension provided to a steel sheet, the minimum tension provided to a steel sheet by an insulating film at a temperature of 100° C. to 200° C. is set to be 10 MPa or more. By evaluating the minimum tension provided to a steel sheet by an insulating film at a temperature of 100° C. to 200° C., at which a transformer is assumed to be practically operated, it is possible to improve low-noise performance. Evaluation at a temperature of lower than 100° C. or higher than 200° C. is inappropriate from the viewpoint of improving low-noise performance, because such a temperature is much different from a temperature in practical operation. In addition, the minimum tension provided to a steel sheet is set to be 10 MPa or more. In the case where the tension provided by an insulating film is less than 10 MPa, since there is an insufficient effect of improving the compressive-stress property of magnetostriction, there is an increase in noise. It is preferable that the tension be 12 MPa or more. Although there is no particular limitation on the upper limit of the tension, it is preferable that the tension be 30 MPa or less from an economic viewpoint, because there is an increase in cost in the case where the tension is increased more than necessary.

Here, the minimum tension provided to a steel sheet by an insulating film at a temperature of 100° C. to 200° C. is determined by using the following method.

The tension provided to a steel sheet is defined as tension in the rolling direction and calculated by using equation (1) below from the warpage quantity of the steel sheet after an insulating film on one side of the steel sheet has been removed by using, for example, an alkali or an acid.

$$\text{tension provided to a steel sheet [MPa]} = \text{Young's modulus of the steel sheet [GPa]} \times \text{thickness [mm]} \times \text{warpage quantity [mm]} / (\text{warpage determination length [mm]})^2 \times 10^3 \quad (1)$$

Here, Young's modulus of a steel sheet is set to be 132 GPa.

The tension provided to the steel sheet which is calculated from the minimum warpage quantity when the sample for determination is heated from a temperature of 100° C. to a temperature of 200° C. at a heating rate of 20° C./hr is defined as the minimum tension provided to the steel sheet by the insulating film at a temperature of 100° C. to 200° C.

In the disclosed embodiments, the expression "the minimum tension provided to a steel sheet by an insulating film at a temperature of 100° C. to 200° C. is 10 MPa or more" means that the tension provided to the steel sheet by the insulating film at a temperature in the range of 100° C. to 200° C. is 10 MPa or more.

The insulating film for which the disclosed embodiments is intended has a chemical composition containing Si, P, O, and at least one selected from Mg, Ca, Ba, Sr, Zn, Al, Mn, and Co. In addition, although the insulating film according to the disclosed embodiments may contain Cr, it is preferable that Cr not be contained from the viewpoint of environmental load.

P forms a P—O—P network structure in the form of a phosphate and is indispensable for achieving satisfactory adhesiveness between a basis material (a basis metal or a base film such as a forsterite film or a ceramic film), on which an insulating film is formed, and the insulating film.

Si forms an Si—O—Si network structure in the form of a silicate and contributes to improving moisture absorption resistance, heat resistance of an insulating film and tension-providing capability due to the low thermal expansion coefficient thereof.

To stably maintain a P—O—P network structure and an Si—O—Si network structure, it is necessary that at least one metal element selected from among Mg, Ca, Ba, Sr, Zn, Al, Mn, and Co be contained.

In addition, the insulating film according to the disclosed embodiments may contain metal elements other than those described above. Examples of such metal elements include Li, Zr, Na, K, Hf, Ti, and W.

Here, it is possible to determine whether or not the elements described above are contained in the insulating film by performing, for example, X-ray fluorescence spectrometry or GD-OES (glow discharge optical emission spectrometry).

It is possible to form the insulating film according to the disclosed embodiments, which has the chemical composition and structures described above, by applying a treatment solution, which is prepared by mixing, for example, at least one selected from the phosphates of Mg, Ca, Ba, Sr, Zn, Al, Mn, and Co, colloidal silica, and optional additives, to, for example, the surface of a grain-oriented electrical steel sheet, and by performing thereafter a baking treatment. To improve the compatibility and dispersibility in the treatment solution, a surface treatment utilizing, for example, Al may be performed on the surface of the silica in the colloidal silica, and a dispersant such as an aluminate may be appropriately added to the colloidal solution. In addition, regarding the kind of phosphate, primary phosphates (biphosphates) are readily available and are preferably used.

Although there is no particular limitation on the optional additives described above, examples of the additives include $Li_2O$, NaOH, $K_2SO_4$, $TiOSO_4 \cdot nH_2O$, $ZrO_2$, $HfO_2$, and $Na_2WO_4$, and $Li_2O$ and $ZrO_2$ are preferably used.

In addition, regarding the content ratio between a phosphate and colloidal silica in the treatment solution, it is preferable that the colloidal silica content be, in terms of solid content, 50 pts.mass to 150 pts.mass or more preferably 50 pts.mass to 120 pts.mass with respect to a phosphate content of 100 pts.mass. In addition, in the case where optional additives are used, it is preferable that the contents of such additives be, in terms of solid content, 1.0 pts.mass to 15 pts.mass or more preferably 2.0 pts.mass to 10 pts.mass with respect to a phosphate content of 100 pts.mass.

The crystallinity of an insulating film is 20% or more.

Generally, a grain-oriented electrical steel sheet is covered with a vitreous insulating film composed mainly of a phosphate. Such an insulating film is formed at a high temperature of 800° C. to 1000° C. By controlling the thermal expansion coefficient of an insulating film to be lower than that of a steel sheet, it is possible to provide the steel sheet with tensile stress, after the insulating film has been formed by performing a baking treatment. Although an insulating film is usually vitreous, that is, glassy, it is possible to achieve lower thermal expansion coefficient by dispersing a crystal phase having a low thermal expansion coefficient in the glass.

From the viewpoint described above, in the disclosed embodiments, a crystal phase is contained in the insulating film in an amount of 20% or more in terms of crystallinity to improve tension provided to the steel sheet. It is necessary that the crystallinity be 20% or more to sufficiently decrease the thermal expansion coefficient of the insulating film. The upper limit of the crystallinity may be 100%, that is, the film may be composed of only a crystal phase. However, it is preferable that the upper limit be 80% or less or more preferably 60% or less from the viewpoint of, for example, corrosion resistance.

Here, the term "crystallinity" refers to the content of a crystal phase in an insulating film, and it is possible to determine the crystallinity, for example, by using a method in which X-ray diffractometry is performed or by using a method which utilizes a difference in etching rate between a glass phase and a crystal phase in such a manner that an insulating film is slightly etched by using, for example, an acid, an alkali, or warm water to determine an area ratio between the glass phase and the crystal phase by observing the surface asperity. It is preferable that the latter method be used from the viewpoint of performing the determination with ease.

It is possible to achieve the desired crystallinity by controlling a heating rate to a baking temperature, a baking temperature, a baking time, and so forth when a baking treatment is performed.

The easiest method for precipitating a crystal phase having a low thermal expansion coefficient in a vitreous insulating film composed mainly of a phosphate is the method disclosed in Patent Literature 3 or Patent Literature 4 in which, for example, a heat treatment is performed for crystallization. In such a method, pyrophosphate crystals (such as $Mg_2P_2O_7$ and $Ni_2P_2O_7$) are mainly precipitated. The thermal expansion coefficients of such pyrophosphates are very low. For example, the average thermal expansion coefficient of $Mg_2P_2O_7$ is $43 \times 10^{-7}$ (° $C.^{-1}$) in a temperature range of 25° C. to 1000° C. Therefore, such pyrophosphates significantly contribute to decreasing the thermal expansion coefficient of an insulating film. However, since $Mg_2P_2O_7$ contracts at a temperature in the range from room temperature to a temperature of about 70° C. due to structural phase transition, the average thermal expansion coefficient of $Mg_2P_2O_7$ is high, that is, $70 \times 10^{-7}$ (° $C.^{-1}$), in a temperature range of 100° C. to 1000° C. Due to the influence of such contraction, there is a significant decrease in tension provided to a steel sheet at around 100° C.

The iron core of a transformer is immersed in an insulating oil, and there is an increase in the temperature of the insulating oil to a temperature of about 150° C. in operation due to energy loss caused by, for example, iron loss or copper loss. Therefore, the compressive-stress property of magnetostriction at a temperature of 100° C. to 200° C. is what has an effect on noise in practical operation. Although there is a slight decrease in tension due to an increase in temperature from room temperature even in the case of an insulating film of the related art composed of only a glass phase, the degree of decrease is estimated by using the formula (baking temperature−iron core temperature)/(baking temperature−room temperature), and, in the case where a baking temperature is assumed to be 800° C., the degree of decrease is about 16%, as determined by (800−150)/(800×25)=0.84.

The phenomenon described above is common for pyrophosphates. However, the temperature at which structural phase transition occurs depends on the kind of pyrophosphate. Therefore, it is preferable that a pyrophosphate (such as $Zr_2P_2O_7$, $(MgCo)_2P_2O_7$, or $Co_2P_2O_7$) whose structural phase transition temperature is 200° C. or more be precipitated.

In addition, it is more preferable that a crystal phase having a low thermal expansion coefficient which is different from a pyrophosphate be precipitated in order to prevent structural phase transition per se. Examples of such a crystal phase include cordierite, β-spodumene, quartz, zircon, a zirconium phosphate-based crystal phase, and a tungsten phosphate-based crystal phase.

It is preferable that the static friction coefficient of an insulating film be 0.21 or more and 0.50 or less or more preferably 0.25 or more and 0.50 or less. The iron core of a transformer is manufactured by placing grain-oriented electrical steel sheets on top of one another. The higher the static friction coefficient between the steel sheets, the more likely the layered body is to deform in an integrated manner. Accordingly, there is an increase in the rigidity of the iron core, which results in a further reduction in noise. Therefore, it is preferable that the static friction coefficient be 0.21 or more or more preferably 0.25 or more. On the other hand, since it is necessary to arrange the shape of an iron core by sliding the steel sheets in iron core-assembling work, there is a deterioration in assembling efficiency in the case of steel sheets which are less slidable. Therefore, it is preferable that the static friction coefficient be 0.50 or less.

Examples of a method for controlling static friction coefficient include one in which the contact area between the steel sheets is increased by decreasing the roughness of the surface of the steel sheet as a result of increasing a baking temperature or a baking time to promote the smoothing of the surface of the vitreous film and the static friction coefficient is increased.

It is possible to determine the static friction coefficient by using the method described in EXAMPLES below.

It is preferable that Cr not be contained in an insulating film from the viewpoint of environmental load. In the disclosed embodiments, the effects are achieved without containing Cr: a problem of insufficient provided tension, a problem of a deterioration in moisture absorption resistance, a problem of fusion when stress relief annealing is performed, or the like does not occur.

It is preferable that the average thickness of the insulating film be 4.5 μm or less or more preferably 3.0 μm or less. In the case where the average thickness of the insulating film is excessively large, since there is a decrease in the lamination factor of the steel sheets, there is an increase in effective excitation magnetic flux density, which results in an increase in the degree of magnetostrictive vibration. Therefore, it is preferable that the average thickness of the insulating film be 4.5 μm or less or more preferably 3.0 μm or less.

Although it is usual that, in the case of the grain-oriented electrical steel sheet having an insulating film according to the disclosed embodiments, a ceramic film composed mainly of forsterite is formed on the surface of the steel sheet before the insulating film is formed, other kinds of ceramic films such as metallic nitrides (for example, TiN and $Si_3N_4$) may be formed on the surface of the steel sheet, and otherwise, the insulating film according to the disclosed embodiments may be formed directly on the basis metal.

An example of the method for forming the insulating film according to the disclosed embodiments will be described. A grain-oriented electrical steel sheet which has been subjected to finish annealing is subjected to water cleaning to remove a redundant annealing separator, then, optionally stress relief annealing as needed, a pickling treatment, a water cleaning, and so forth. Subsequently, an insulating film-treatment solution is applied to the surface of the steel sheet, and baking and drying are performed to form an insulating film on the surface of the steel sheet. As the grain-oriented electrical steel sheet which has been subjected to finish annealing, a steel sheet having a forsterite film or a steel sheet having no forsterite film may be used. It is sufficient that the insulating film-treatment solution form an insulating film having a chemical composition containing Si, P, O, and at least one selected from Mg, Ca, Ba, Sr, Zn, Al, Mn, and Co. Regarding a baking condition and a drying condition, it is preferable that the baking temperature be (crystallization temperature+10° C.) or higher and 1100° C. or lower or more preferably 1000° C. or lower to achieve a crystallinity of 20% or more. It is preferable that the baking time be 10 seconds to 90 seconds. Although it is needless to say that it is necessary that, to realize crystallization, the baking temperature be equal to or higher than the crystallization temperature, which is derived by performing TG-DTA (Thermo Gravimetry-Differential Thermal Analysis), it is preferable that baking be performed at a temperature equal to or higher than (crystallization temperature+10° C.) to achieve a crystallinity of 20% or more. In addition, it is preferable that the baking temperature be 1100° C. or lower or more preferably 1000° C. or lower in consideration of the threading performance of a thin steel sheet. It is preferable that the baking holding time be 10 seconds or more to achieve crystallization and be 90 seconds or less from an economic viewpoint.

EXAMPLES

Example 1

A grain-oriented electrical steel sheet after finish annealing having a thickness of 0.23 mm which had been manufactured by using a known method was sheared into a piece having a length in the rolling direction of 300 mm and a length in a direction perpendicular to the rolling direction of 100 mm, subjected to water cleaning to remove unreacted annealing separator (containing mainly MgO), and subjected to stress relief annealing (800° C., 2 hours, $N_2$ atmosphere). A forsterite film was formed on the surface of the steel sheet which had been subjected to stress relief annealing. Subsequently, light pickling was performed with 5 mass % phosphoric acid aqueous solution. The treatment solutions (phosphates, colloidal silica, and optional additives) given in Table 1 were applied to both surfaces of the grain-oriented electrical steel sheets obtained as described above so that the coating weight after a baking treatment was 8 $g/m^2$, and a baking treatment was then performed under the various conditions given in Table 1. A nitrogen atmosphere was used when the baking treatment was performed.

As the phosphates, a primary phosphate aqueous solution was used, and the amount of the phosphates used is expressed in terms of solid content.

As the colloidal silica, AT-30 produced by ADEKA Corporation was used, and the amount of the colloidal silica used is expressed in terms of the solid content of $SiO_2$.

Average Film Thickness

The average thickness of the insulating film on one side was calculated from the result of the observation of a cross section of the insulating film performed by using a SEM.

Identification of Crystal Phase

Crystal phases were identified by performing X-ray diffractometry.

Crystallinity

Crystallinity was determined: by performing mirror polishing with diamond slurry on the surface of the insulating film of the sample, by immersing the polished sample in deionized water having a temperature of 100° C. for 30 minutes, then by observing the surface after the immersing treatment by using a SEM, by defining the area of the eluted surface as the area (AG) of a glass phase, and the area of the un-eluted surface as the area (AC) of a crystal phase, and by calculation using the equation "crystallinity R=AC/(AC+AG)×100".

Minimum tension provided to steel sheet by insulating film at a temperature of 100° C. to 200° C.

The tension provided to a steel sheet was defined as tension in the rolling direction and calculated by using equation (1) below from the warpage quantity of the steel sheet after an insulating film on one side of the steel sheet had been removed by using, for example, an alkali or an acid.

$$\text{tension provided to a steel sheet [MPa]} = \text{Young's modulus of the steel sheet [GPa]} \times \text{thickness [mm]} \times \text{warpage quantity [mm]} / (\text{warpage determination length [mm]})^2 \times 10^3 \quad (1)$$

Here, Young's modulus of a steel sheet is set to be 132 GPa.

The minimum warpage quantity when the sample for determination was heated from a temperature of 100° C. to a temperature of 200° C. at a heating rate of 20° C./hr was used as the warpage quantity at a temperature between 100° C. and 200° C. (that is, corresponding to the minimum tension provided at a temperature between 100° C. and 200° C.)

Static Friction Coefficient

Static friction coefficient was determined by using TYPE: 10 Static Friction Coefficient Tester produced by SHINTO Scientific Co., Ltd.

Noise of a Transformer (Low-Noise Performance)

Noise of a transformer was evaluated by manufacturing a transformer having a capacity of 100 kVA and then by determining noise at a position located 1 m from the transformer body.

TABLE 1

| | Phosphate (g) (in terms of solid content) | | | | | | | | Colloidal Silica (g) | Additive | | Baking Condition | |
|---|---|---|---|---|---|---|---|---|---|---|---|---|---|
| No. | Mg Phosphate | Ca Phosphate | Ba Phosphate | Sr Phosphate | Zn Phosphate | Al Phosphate | Mn Phosphate | Co Phosphate | (in terms of solid content) | | Content (g) | Temperature (° C.) | Time (s) |
| 1 | 100 | | | | | | | | 50 | None | None | 800 | 30 |
| 2 | 100 | | | | | | | | 50 | None | None | 900 | 20 |
| 3 | 100 | | | | | | | | 50 | $ZrO_2$ | 3 | 950 | 60 |
| 4 | 100 | | | | | | | | 80 | $ZrO_2$ | 5 | 850 | 30 |
| 5 | 100 | | | | | | | | 120 | None | None | 1050 | 30 |
| 6 | 70 | | | | | 30 | | | 60 | None | None | 1100 | 10 |
| 7 | 30 | | | | | 70 | | | 70 | None | None | 1000 | 30 |
| 8 | | | | | | 100 | | | 50 | $Li_2O$ | 5 | 800 | 10 |
| 9 | | | | | | 100 | | | 50 | $Li_2O$ | 5 | 800 | 30 |
| 10 | | | | | | 100 | | | 80 | $Li_2O$ | 5 | 800 | 60 |
| 11 | | | | | | 100 | | | 100 | $Li_2O$ | 5 | 800 | 80 |
| 12 | | | | | | 100 | | | 120 | $ZrO_2$ | 5 | 900 | 60 |
| 13 | | | | | | 100 | | | 150 | $ZrO_2$ | 7 | 1000 | 60 |
| 14 | | 100 | | | | | | | 100 | None | None | 1000 | 60 |
| 15 | | | 100 | | | | | | 100 | None | None | 1000 | 30 |
| 16 | | | | 100 | | | | | 100 | None | None | 1000 | 30 |
| 17 | | | | | 100 | | | | 100 | None | None | 1050 | 60 |
| 18 | | | | | | 100 | | | 100 | None | None | 1100 | 20 |
| 19 | | | | | | | 100 | | 100 | None | None | 1100 | 15 |
| 20 | 70 | | | | | | 30 | | 80 | $ZrO_2$ | 5 | 900 | 30 |
| 21 | 80 | 20 | | | | | | | 80 | None | None | 900 | 30 |
| 22 | 50 | | | | | 50 | | | 80 | $Li_2O$ | 5 | 900 | 30 |
| 23 | 50 | | | | 50 | | | | 100 | $ZrO_2$ | 5 | 800 | 30 |
| 24 | | | 50 | 50 | | | | | 100 | $ZrO_2$ | 5 | 950 | 30 |
| 25 | 60 | | | | | 40 | | | 100 | $Li_2O$ | 5 | 1000 | 30 |
| 26 | 20 | | | | | | | 80 | 100 | None | None | 900 | 20 |
| 27 | 50 | | | | | | | 50 | 120 | None | None | 850 | 30 |

| No. | Coating Weight (g/m$^2$) | Average Film Thickness (μm) | Crystal Phase | Crystallinity [%] | Tension Provided (25° C.) [MPa] | Minimum Tension Provided (100-200° C.) [MPa] | Static Friction Coefficient | Noise of a transformer [dBA] | Note |
|---|---|---|---|---|---|---|---|---|---|
| 1 | 8 | 2.0 | None | — | 5.0 | 4.0 | 0.20 | 45 | Comparative Example |
| 2 | 8 | 2.0 | $Mg_2P_2O_7$ | 20 | 10.0 | 7.0 | 0.25 | 42 | Comparative Example |
| 3 | 8 | 2.0 | $ZrSiO_4$ | 20 | 14.0 | 11.7 | 0.32 | 38 | Example |
| 4 | 8 | 2.5 | $Zr_2P_2O_7$ | 30 | 13.0 | 11.0 | 0.25 | 38 | Example |
| 5 | 8 | 2.8 | $SiO_2$ | 50 | 12.0 | 10.0 | 0.22 | 40 | Example |
| 6 | 8 | 2.1 | $Mg_2Al_3(AlSi_5O_{18})$ | 60 | 15.0 | 12.5 | 0.28 | 34 | Example |
| 7 | 8 | 1.9 | $Mg_2Al_3(AlSi_5O_{18})$ | 50 | 14.0 | 12.0 | 0.30 | 35 | Example |

TABLE 1-continued

| | | | | | | | | | |
|---|---|---|---|---|---|---|---|---|---|
| 8 | 8 | 1.6 | $LiAlSi_2O_6$ | 15 | 12.0 | 8.0 | 0.18 | 42 | Comparative Example |
| 9 | 8 | 1.5 | $LiAlSi_2O_6$ | 20 | 14.0 | 11.5 | 0.25 | 38 | Example |
| 10 | 8 | 2.0 | $LiAlSi_2O_6$ | 40 | 16.0 | 13.0 | 0.25 | 35 | Example |
| 11 | 8 | 2.4 | $LiAlSi_2O_6$ | 80 | 18.0 | 15.0 | 0.26 | 34 | Example |
| 12 | 8 | 2.7 | $ZrSiO_4$ | 30 | 14.0 | 11.5 | 0.28 | 38 | Example |
| 13 | 8 | 3.0 | $ZrSiO_4$ | 35 | 15.0 | 13.0 | 0.32 | 34 | Example |
| 14 | 8 | 2.6 | $SiO_2$ | 50 | 13.0 | 11.5 | 0.25 | 37 | Example |
| 15 | 8 | 2.6 | $SiO_2$ | 30 | 12.0 | 10.5 | 0.21 | 39 | Example |
| 16 | 8 | 2.7 | $SiO_2$ | 30 | 12.0 | 10.5 | 0.20 | 39 | Example |
| 17 | 8 | 2.5 | $SiO_2$ | 60 | 14.0 | 12.0 | 0.26 | 36 | Example |
| 18 | 8 | 2.3 | $SiO_2$ | 30 | 12.0 | 10.0 | 0.22 | 39 | Example |
| 19 | 8 | 2.4 | $SiO_2$ | 30 | 12.0 | 10.0 | 0.25 | 38 | Example |
| 20 | 8 | 2.3 | $Zr_2P_2O_7$ | 25 | 13.0 | 10.5 | 0.25 | 37 | Example |
| 21 | 8 | 2.5 | $SiO_2$ | 30 | 12.0 | 10.0 | 0.23 | 39 | Example |
| 22 | 8 | 2.3 | $LiAlSi_2O_6$ | 30 | 13.0 | 11.0 | 0.26 | 38 | Example |
| 23 | 8 | 2.6 | $Zr_2P_2O_7$ | 20 | 13.0 | 10.5 | 0.20 | 39 | Example |
| 24 | 8 | 2.6 | $Zr_2P_2O_7$ | 40 | 15.0 | 12.5 | 0.25 | 34 | Example |
| 25 | 8 | 2.5 | $Mg_2Al_3(AlSi_5O_{18})$ | 40 | 13.0 | 11.0 | 0.28 | 37 | Example |
| 26 | 8 | 2.3 | $Co_2P_2O_7$ | 30 | 13.0 | 12.0 | 0.28 | 35 | Example |
| 27 | 8 | 2.1 | $(MgCo)_2P_2O_7$ | 25 | 12.0 | 11.0 | 0.27 | 36 | Example |

As indicated by the results described above, it is possible to reduce noise of a transformer to 40 dBA or less in the case of the disclosed embodiments.

Example 2

A grain-oriented electrical steel sheet after finish annealing having a thickness of 0.27 mm which had been manufactured by using a known method was sheared into a piece having a length in the rolling direction of 300 mm and a length in a direction perpendicular to the rolling direction of 100 mm, subjected to water cleaning to remove unreacted annealing separator (containing mainly MgO), and subjected to stress relief annealing (800° C., 2 hours, $N_2$ atmosphere). A forsterite film was formed on the surface of the steel sheet which had been subjected to stress relief annealing. Subsequently, light pickling was performed with 5 mass % phosphoric acid aqueous solution. The treatment solutions (phosphates, colloidal silica, optional $CrO_3$, and optional additives) given in Table 2 were applied to both surfaces of the grain-oriented electrical steel sheets obtained as described above so that the coating weight after a baking treatment was 12 g/m$^2$, and a baking treatment was then performed under the various conditions given in Table 2. A nitrogen atmosphere was used when the baking treatment was performed.

As the phosphates, a primary phosphate aqueous solution was used, and the amount of the phosphates used is expressed in terms of solid content.

As the colloidal silica, ST-C produced by Nissan Chemical Corporation was used, and the amount of the colloidal silica used is expressed in terms of the solid content of $SiO_2$.

Average Film Thickness

The average thickness of the insulating film on one side was calculated from the result of the observation of a cross section of the insulating film performed by using a SEM.

Identification of Crystal Phase

Crystal phases were identified by performing X-ray diffractometry.

Crystallinity

Crystallinity was determined: by performing mirror polishing with diamond slurry on the surface of the insulating film of the sample, by immersing the polished sample in deionized water having a temperature of 100° C. for 30 minutes, then by observing the surface after the immersing treatment by using a SEM, by defining the area of the eluted surface as the area (AG) of a glass phase, and the area of the un-eluted surface as the area (AC) of a crystal phase, and by calculation using the equation "crystallinity R=AC/(AC+AG)×100".

Minimum tension provided to steel sheet by insulating film at a temperature of 100° C. to 200° C.

The tension provided to a steel sheet was defined as tension in the rolling direction and calculated by using equation (1) below from the warpage quantity of the steel sheet after an insulating film on one side of the steel sheet had been removed by using, for example, an alkali or an acid.

$$\text{tension provided to a steel sheet [MPa]}=\text{Young's modulus of the steel sheet [GPa]}\times\text{thickness [mm]}\times\text{warpage quantity [mm]}/(\text{warpage determination length [mm]})^2\times10^3 \quad (1)$$

Here, Young's modulus of a steel sheet is set to be 132 GPa.

The minimum warpage quantity when the sample for determination was heated from a temperature of 100° C. to a temperature of 200° C. at a heating rate of 20° C./hr was used as the warpage quantity at a temperature between 100° C. and 200° C. (that is, corresponding to the minimum tension provided at a temperature between 100° C. and 200° C.)

Static Friction Coefficient

Static friction coefficient was determined by using TYPE: 10 Static Friction Coefficient Tester produced by SHINTO Scientific Co., Ltd.

Noise of a Transformer

Noise of a transformer was evaluated by manufacturing a transformer having a capacity of 100 kVA and then by determining noise at a position located 1 m from the transformer body.

TABLE 2

| No. | Phosphate (g) (in terms of solid content) Mg Phosphate | Al Phosphate | Colloidal Silica (g) (in terms of solid content) | $CrO_3$ (g) | Additive | Content (g) | Baking Condition Temperature (° C.) | Time (s) | Coating Weight (g/m$^2$) | Average Film Thickness (μm) |
|---|---|---|---|---|---|---|---|---|---|---|
| 1 | 100 | | 50 | 15 | None | None | 800 | 30 | 12 | 2.3 |
| 2 | 100 | | 50 | 12 | None | None | 900 | 20 | 12 | 2.4 |
| 3 | 100 | | 50 | 0 | $ZrO_2$ | 3 | 950 | 60 | 12 | 2.8 |
| 4 | 100 | | 80 | 0 | $ZrO_2$ | 5 | 850 | 30 | 12 | 2.9 |
| 5 | 100 | | 120 | 8 | None | None | 1050 | 30 | 12 | 3.0 |
| 6 | 100 | | 120 | 8 | None | None | 1050 | 60 | 12 | 3.0 |
| 7 | 100 | | 120 | 8 | None | None | 1050 | 90 | 12 | 2.9 |
| 8 | 100 | | 120 | 8 | None | None | 1050 | 120 | 12 | 2.9 |
| 9 | | 100 | 50 | 0 | $Li_2O$ | 5 | 800 | 10 | 12 | 2.2 |
| 10 | | 100 | 50 | 6 | $Li_2O$ | 5 | 800 | 30 | 12 | 2.1 |
| 11 | | 100 | 50 | 6 | $Li_2O$ | 5 | 800 | 60 | 12 | 2.1 |
| 12 | | 100 | 50 | 0 | $Li_2O$ | 5 | 800 | 80 | 12 | 2.3 |
| 13 | 70 | 30 | 80 | 0 | $ZrO_2$ | 5 | 900 | 10 | 12 | 2.8 |
| 14 | 70 | 30 | 80 | 0 | $ZrO_2$ | 5 | 900 | 60 | 12 | 2.8 |
| 15 | 70 | 30 | 80 | 0 | $ZrO_2$ | 5 | 900 | 120 | 12 | 2.7 |

| No. | Crystal Phase | Crystallinity [%] | Tension Provided (25° C.) [MPa] | Minimum Tension Provided (100-200° C.) [MPa] | Static Friction Coefficient | Noise of a transformer [dBA] | Note |
|---|---|---|---|---|---|---|---|
| 1 | None | — | 7.0 | 6.0 | 0.23 | 45 | Comparative Example |
| 2 | $Mg_2P_2O_7$ | 20 | 12.0 | 9.0 | 0.25 | 42 | Comparative Example |
| 3 | $ZrSiO_4$ | 20 | 14.0 | 11.8 | 0.28 | 36 | Example |
| 4 | $Zr_2P_2O_7$ | 30 | 13.0 | 11.0 | 0.23 | 38 | Example |
| 5 | $SiO_2$ | 50 | 13.0 | 11.0 | 0.23 | 40 | Example |
| 6 | $SiO_2$ | 50 | 13.0 | 11.0 | 0.25 | 38 | Example |
| 7 | $SiO_2$ | 50 | 13.0 | 11.0 | 0.30 | 37 | Example |
| 8 | $SiO_2$ | 50 | 13.0 | 10.5 | 0.35 | 36 | Example |
| 9 | $LiAlSi_2O_6$ | 15 | 12.0 | 9.3 | 0.23 | 42 | Comparative Example |
| 10 | $LiAlSi_2O_6$ | 20 | 14.0 | 11.7 | 0.24 | 38 | Example |
| 11 | $LiAlSi_2O_6$ | 20 | 14.0 | 11.7 | 0.25 | 35 | Example |
| 12 | $LiAlSi_2O_6$ | 20 | 14.0 | 11.7 | 0.28 | 34 | Example |
| 13 | $Zr_2P_2O_7$ | 25 | 13.0 | 11.0 | 0.24 | 37 | Example |
| 14 | $Zr_2P_2O_7$ | 25 | 13.0 | 11.0 | 0.30 | 35 | Example |
| 15 | $Zr_2P_2O_7$ | 25 | 13.0 | 11.0 | 0.50 | 35 | Example |

As indicated in Table 2, it is clarified that, whether or not Cr is contained in an insulating film-treatment solution, it is possible to reduce noise of a transformer to 40 dBA or less in the case where the crystallinity of an insulating film is 20% or more and the minimum tension provided to a steel sheet at a temperature of 100° C. to 200° C. is 10 MPa or more.

Example 3

The effect of the average thickness of an insulating film on noise of a transformer was investigated. The average thickness of an insulating film was varied by controlling application amount, that is, coating weight as shown in Table 3, where the treatment solutions having used for No. 1, No. 2, and No. 3 in Table 2 in EXAMPLE 2 were used. As a sample of a grain-oriented electrical steel sheet on which an insulating film was to be formed, a steel sheet after finish annealing having a thickness of 0.20 mm which had been manufactured by using a known method was sheared into a piece having a length in the rolling direction of 300 mm and a length in a direction perpendicular to the rolling direction of 100 mm, subjected to removal of unreacted annealing separator (containing mainly MgO), subjected to stress relief annealing (800° C., 2 hours, $N_2$ atmosphere) so that a forsterite film was formed on the surface of the steel sheet, and subjected to light pickling with 5 mass % phosphoric acid aqueous solution.

By using the same methods as used in EXAMPLE 2, average film thickness, crystallinity, minimum tension provided to a steel sheet by an insulating film at a temperature of 100° C. to 200° C., static friction coefficient, and noise of a transformer were determined, and crystal phases were identified.

TABLE 3

| No. | Mg Phosphate (g) (in terms of solid content) | Colloidal Silica (g) (in terms of solid content) | $CrO_3$ (g) | Additive | Additive Content (g) | Baking Condition Temperature (° C.) | Baking Condition Time (s) | Coating Weight ($g/m^2$) | Average Film Thickness (μm) |
|---|---|---|---|---|---|---|---|---|---|
| 1 | 100 | 50 | 15 | None | None | 800 | 30 | 8 | 1.5 |
| 2 | 100 | 50 | 15 | None | None | 800 | 30 | 12 | 2.3 |
| 3 | 100 | 50 | 15 | None | None | 800 | 30 | 15 | 2.8 |
| 4 | 100 | 50 | 15 | None | None | 800 | 30 | 20 | 3.8 |
| 5 | 100 | 50 | 12 | None | None | 900 | 20 | 8 | 1.6 |
| 6 | 100 | 50 | 12 | None | None | 900 | 20 | 12 | 2.4 |
| 7 | 100 | 50 | 12 | None | None | 900 | 20 | 15 | 3.0 |
| 8 | 100 | 50 | 12 | None | None | 900 | 20 | 20 | 4.0 |
| 9 | 100 | 50 | 0 | $ZrO_2$ | 3 | 950 | 60 | 8 | 1.8 |
| 10 | 100 | 50 | 0 | $ZrO_2$ | 3 | 950 | 60 | 12 | 2.8 |
| 11 | 100 | 50 | 0 | $ZrO_2$ | 3 | 950 | 60 | 15 | 3.4 |
| 12 | 100 | 50 | 0 | $ZrO_2$ | 3 | 950 | 60 | 20 | 4.5 |

| No. | Crystal Phase | Crystallinity [%] | Tension Provided (25° C.) [MPa] | Minimum Tension Provided (100-200° C.) [MPa] | Static Friction Coefficient | Noise of a transformer [dBA] | Note |
|---|---|---|---|---|---|---|---|
| 1 | None | — | 5.0 | 4.2 | 0.23 | 45 | Comparative Example |
| 2 | None | — | 7.0 | 6.0 | 0.23 | 45 | Comparative Example |
| 3 | None | — | 8.7 | 7.5 | 0.22 | 44 | Comparative Example |
| 4 | None | — | 9.8 | 8.2 | 0.20 | 45 | Comparative Example |
| 5 | $Mg_2P_2O_7$ | 20 | 10.0 | 7.0 | 0.24 | 42 | Comparative Example |
| 6 | $Mg_2P_2O_7$ | 20 | 12.0 | 9.0 | 0.25 | 42 | Comparative Example |
| 7 | $Mg_2P_2O_7$ | 20 | 13.0 | 10.0 | 0.23 | 37 | Example |
| 8 | $Mg_2P_2O_7$ | 20 | 14.5 | 11.0 | 0.22 | 38 | Example |
| 9 | $ZrSiO_4$ | 20 | 14.0 | 11.5 | 0.25 | 38 | Example |
| 10 | $ZrSiO_4$ | 20 | 14.0 | 11.8 | 0.28 | 36 | Example |
| 11 | $ZrSiO_4$ | 20 | 14.0 | 11.5 | 0.23 | 39 | Example |
| 12 | $ZrSiO_4$ | 20 | 14.0 | 11.5 | 0.21 | 40 | Example |

As indicated in Table 3, it is clarified that, whether or not Cr is contained in an insulating film-treatment solution, it is possible to reduce noise of a transformer to 40 dBA or less in the case where the crystallinity of an insulating film is 20% or more and the minimum tension provided to a steel sheet at a temperature of 100° C. to 200° C. is 10 MPa or more.

The invention claimed is:

1. A grain-oriented electrical steel sheet having an insulating film disposed on a surface thereon, the insulating film having a chemical composition comprising Si, P, O, and at least one selected from the group consisting of Mg, Ca, Ba, Sr, Zn, Al, Mn, and Co,
   wherein the insulating film includes 20% or more of a crystal phase, the crystal phase consisting of one of $Zr_2P_2O_7$, $(MgCo)_2P_2O_7$, $Co_2P_2O_7$, cordierite, β-spodumene, quartz, zircon, a zirconium phosphate-based crystal phase, or a tungsten phosphate-based crystal phase, and
   a minimum tension provided to the steel sheet by the insulating film at a temperature in a range of 100° C. to 200° C. is 10.5 MPa or more.

2. The grain-oriented electrical steel sheet according to claim 1, wherein the insulating film has a static friction coefficient in a range of 0.21 or more and 0.50 or less.

3. The grain-oriented electrical steel sheet according to claim 1, wherein the chemical composition excludes Cr.

4. The grain-oriented electrical steel sheet according to claim 1, wherein the insulating film has an average film thickness in a range of 4.5 μm or less.

5. An iron core of a transformer, the iron core including the grain-oriented electrical steel sheet according to claim 1.

6. A transformer including the iron core according to claim 5.

7. A method for reducing noise of a transformer, the method comprising providing an iron core of the transformer, the iron core including the grain-oriented electrical steel sheet according to claim 1.

8. The grain-oriented electrical steel sheet according to claim 2, wherein the chemical composition excludes Cr.

9. The grain-oriented electrical steel sheet according to claim 3, wherein the insulating film has an average film thickness in a range of 4.5 μm or less.

10. An iron core of a transformer, the iron core including the grain-oriented electrical steel sheet according to claim 2.

11. An iron core of a transformer, the iron core including the grain-oriented electrical steel sheet according to claim 3.

12. An iron core of a transformer, the iron core including the grain-oriented electrical steel sheet according to claim 4.

13. An iron core of a transformer, the iron core including the grain-oriented electrical steel sheet according to claim 9.

14. A transformer including the iron core according to claim 10.

15. A transformer including the iron core according to claim 11.

16. A transformer including the iron core according to claim 12.

17. A transformer including the iron core according to claim 13.

18. A method for reducing noise of a transformer, the method comprising providing an iron core of the transformer, the iron core including the grain-oriented electrical steel sheet according to claim 2.

19. A method for reducing noise of a transformer, the method comprising providing an iron core of the transformer, the iron core including the grain-oriented electrical steel sheet according to claim 3.

20. A method for reducing noise of a transformer, the method comprising providing an iron core of the transformer, the iron core including the grain-oriented electrical steel sheet according to claim 4.

* * * * *